(12) United States Patent
Radzevich

(10) Patent No.: US 8,231,493 B2
(45) Date of Patent: Jul. 31, 2012

(54) DIFFERENTIAL HAVING IMPROVED TORQUE CAPACITY AND TORQUE DENSITY

(75) Inventor: Stephen P. Radzevich, Sterling Heights, MI (US)

(73) Assignee: Eaton Corporation, Southfield, MI (US)

( * ) Notice: Subject to any disclaimer, the term of this patent is extended or adjusted under 35 U.S.C. 154(b) by 406 days.

(21) Appl. No.: 12/509,624

(22) Filed: Jul. 27, 2009

(65) Prior Publication Data

US 2011/0021306 A1 Jan. 27, 2011

(51) Int. Cl.
*F16H 48/20* (2012.01)
(52) U.S. Cl. .......................................... 475/231; 74/650
(58) Field of Classification Search .................. 475/230, 475/231, 235, 236, 240; 74/650
See application file for complete search history.

(56) References Cited

U.S. PATENT DOCUMENTS

| | | | |
|---|---|---|---|
| 3,253,483 A | 5/1966 | McCaw | |
| 3,264,900 A | 8/1966 | Hartupee | |
| 3,611,833 A | 10/1971 | Baremor | 74/711 |
| 3,886,813 A | 6/1975 | Baremor | 74/710 |
| 3,906,812 A | 9/1975 | Kagata | |
| 4,136,582 A | 1/1979 | Boor | 74/710 |
| 4,498,355 A | 2/1985 | Schou | 74/650 |
| 4,735,108 A | 4/1988 | Teraoka et al. | |
| 4,754,661 A | 7/1988 | Barnett | 74/459.5 |
| 4,939,953 A | 7/1990 | Yasui | 475/233 |
| 4,978,329 A | 12/1990 | Yasui et al. | 475/84 |
| 5,019,021 A | 5/1991 | Janson | 475/150 |
| 5,413,015 A | 5/1995 | Zentmyer | 74/650 |
| 5,715,733 A | 2/1998 | Dissett | 74/650 |
| 5,727,430 A | 3/1998 | Valente | 74/650 |
| 5,823,908 A | 10/1998 | Stefanek | 475/230 |
| 5,901,618 A | 5/1999 | Tyson et al. | 74/650 |
| 6,062,105 A | 5/2000 | Tyson et al. | 74/650 |
| 6,083,134 A | 7/2000 | Godlew | 475/231 |
| 6,105,465 A | 8/2000 | Tyson et al. | 74/650 |
| 6,374,701 B1 | 4/2002 | Tittjung | |
| 6,394,927 B1 | 5/2002 | Bongard | 475/231 |
| 6,463,830 B1 | 10/2002 | Ito et al. | |
| 6,688,194 B2 | 2/2004 | Dissett et al. | 74/650 |
| 6,884,196 B1 | 4/2005 | Ziech | 475/230 |
| 7,178,420 B2 | 2/2007 | Barth | 74/459.5 |
| 7,264,569 B2 | 9/2007 | Fox | 475/241 |
| 2003/0066386 A1 | 4/2003 | Dissett et al. | 74/650 |
| 2004/0237689 A1 | 12/2004 | Hiltbrand | 74/457 |
| 2005/0288144 A1 | 12/2005 | Wang et al. | 475/221 |
| 2008/0103008 A1 | 5/2008 | Gleasman et al. | 475/226 |
| 2008/0190240 A1 | 8/2008 | Dissett et al. | |

FOREIGN PATENT DOCUMENTS

| | | |
|---|---|---|
| EP | 0091747 A2 | 10/1983 |
| EP | 0683333 A1 | 11/1995 |
| EP | 1767817 A1 | 3/2007 |
| EP | 1898124 A2 | 3/2008 |
| FR | 769239 | 8/1934 |
| FR | 2382627 A1 | 9/1978 |
| WO | 2005111471 A1 | 11/2005 |

*Primary Examiner* — Justin Holmes
(74) *Attorney, Agent, or Firm* — Bliss McGlynn, P.C.

(57) ABSTRACT

A locking differential for an automotive vehicle including a housing and a differential mechanism supported in the housing. The differential mechanism includes a pair of clutch members where each of the clutch members presents an inwardly directed face. Each face includes a groove disposed in spacing relationship with respect to the other. A cross pin is received in the grooves and is operatively connected for rotation with the housing. The clutch members are axially moveable within the housing so that they may engage respective clutch members coupled to a pair of axle half shafts. Each of the grooves in the clutch members defines a first predetermined radius of curvature. The cross pin defines a second radius of curvature wherein the first radius of curvature of the groove is greater than the second radius of curvature of the cross pin such that contact between the cross pin and the groove defines a line extending along the axis of the cross pin.

4 Claims, 4 Drawing Sheets

DIFFERENTIAL HAVING IMPROVED TORQUE CAPACITY AND TORQUE DENSITY

BACKGROUND OF THE INVENTION

1. Field of the Invention

The present invention relates, generally, to locking differentials for automotive vehicles, and more specifically to features of a locking differential that result in increased torque capacity and density for a given size of the differential.

2. Description of the Related Art

Locking differentials of the type contemplated by the present invention are employed as a part of a drive train and generally include a pair of clutch members supported for rotation in a housing. A pair of side gears are splined for rotation to corresponding axle half shafts. A clutch mechanism is interposed between the clutch members and the side gears. A cross pin is operatively mounted for rotation with the housing and is received in a pair of opposed grooves formed on the inwardly facing surfaces of the clutch members. In the event of excess differential rotation between the axle half shafts, such as when one tire is supported on a slippery surface, the cross pin acts on the associated clutch member to engage the clutch mechanism thereby coupling the pair of axle half shafts together.

While locking differentials of this type have generally worked for their intended purposes, certain disadvantages remain. More specifically, the size of the components of the differential are often dictated by the amount of torque that can be transmitted thereby. Higher torque requirements typically require larger, more robust components such as the cross pin, clutch members, etc. This design limitation ultimately increases the cost of a differential for the given amount of torque capacity and density required in any application.

Thus, there remains a need in the art for a locking differential that is designed so as to increase its torque capacity and density without the need for increasing the size of the related components, thereby reducing the cost of the differential.

SUMMARY OF THE INVENTION

The present invention overcomes the disadvantages in the related art in a locking differential for an automotive vehicle including a housing and a differential mechanism supported in the housing. The differential mechanism includes a pair of clutch members disposed in spaced axial relationship with respect to one another and operatively supported for rotation with the housing. A pair of side gears is operatively adapted for rotation with a corresponding pair of axle half shafts. A pair of clutch members is operatively disposed between each corresponding pair of clutch members and the side gears. The clutch members are axially moveable within the housing to engage a respective clutch mechanism to couple the axle half shafts together in the event of a predetermined amount of differential movement between the axle half shafts. Each of the pair of clutch members presents an inwardly directed face. Each face includes a groove disposed in facing relationship with respect to the other. A cross pin is received in the grooves and operatively connected for rotation with the housing. Each of the grooves defines a first predetermined radius of curvature. The cross pin defines a second radius of curvature wherein the first predetermined radius curvature of the groove is greater than the second predetermined radius of curvature of the cross pin. This interrelationship between the cross pin and the groove dictates that contact between the cross pin and the groove defines a line extending along the axis of the cross pin.

During normal, non-differentiated movement between the axle half shafts, such as when a vehicle is driving in a straight path down a road, the line contact is more than sufficient to transfer torque between the cross pin and the clutch members because all the components rotate together. However, in the event of differential movement between one or the other of the axle half shaft and its associated side gear, the cross pin moves relative to the groove and engages an opposed pair of working surfaces. Making the radius of curvature of the groove larger than that of the cross pin creates less resistance in the movement of the cross pin to the working surfaces of the clutch members at the beginning of this differential movement. Accordingly, the specific interrelationship between the cross pin and the groove reduces the shock that is generated at this moment of differentiation. This results in smoother operation of the differential and reduced wear between the cross pin and the groove of the clutch members.

BRIEF DESCRIPTION OF THE DRAWINGS

Other objects, features and advantages of the present invention will be readily appreciated, as the same becomes better understood after reading the subsequent description taken in connection with the accompanying drawings wherein.

DETAILED DESCRIPTION

Figure 1:
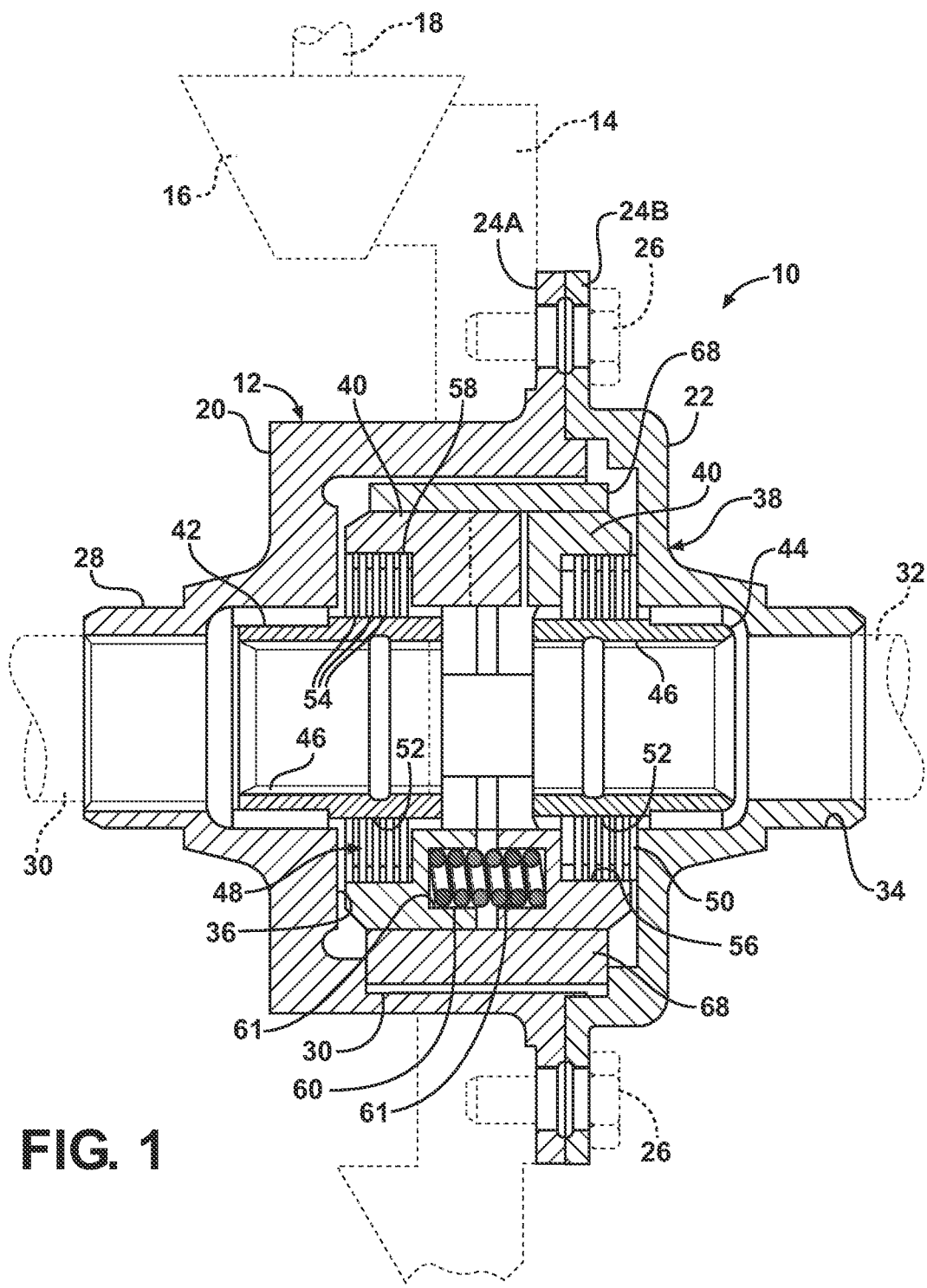
FIG. 1 is a cross-sectional side view of a locking differential illustrating a driveshaft, pinion gear and ring gear of the drive train in phantom.
Figure 2:
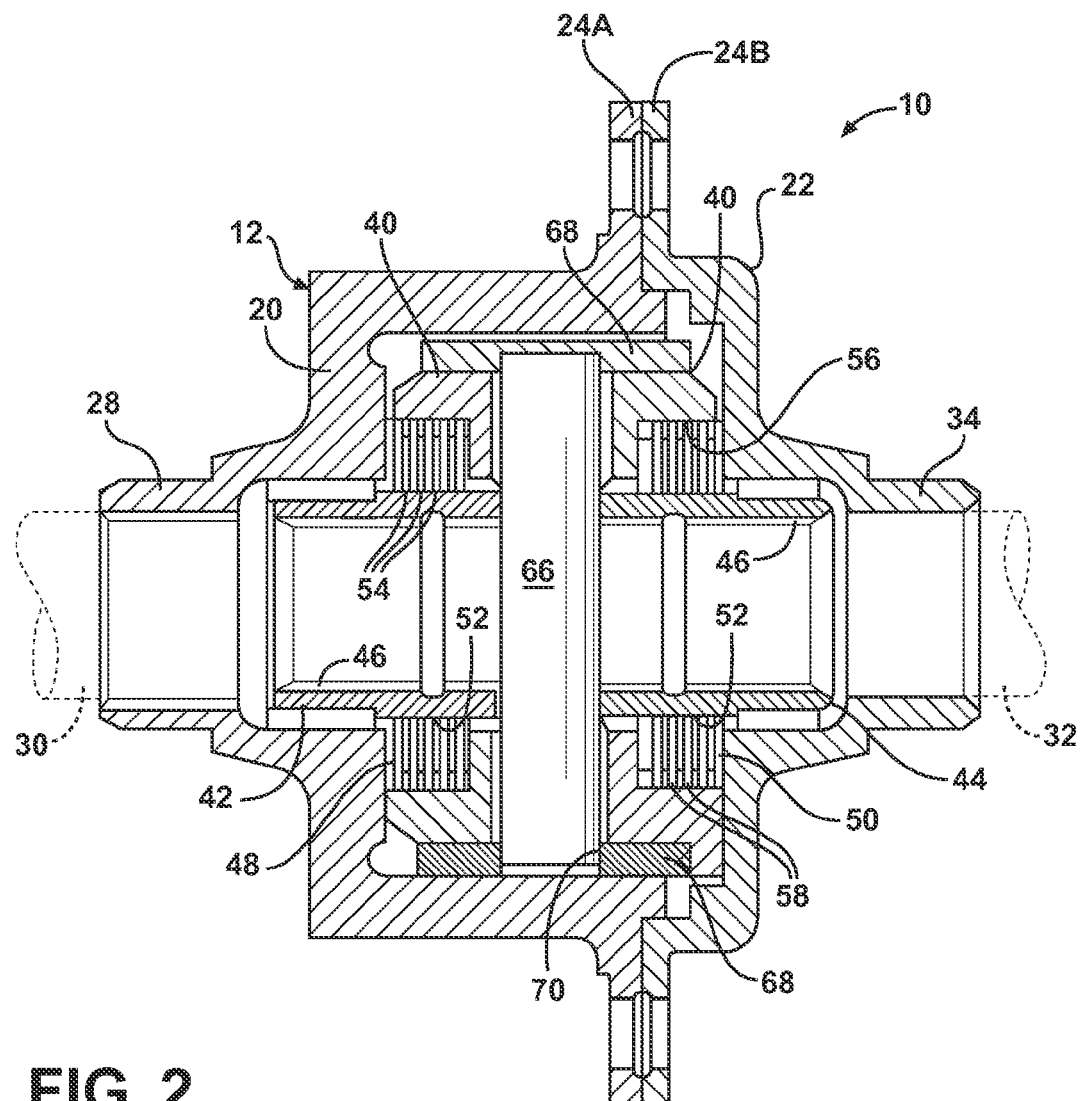
FIG. 2 is a cross-sectional side view of a locking differential illustrating the disposition of the cross pin relative to the clutch members.

One embodiment of a locking differential of the type contemplated by the present invention is generally indicated at 10 in FIGS. 1-2. The locking differential 10 is designed to be employed as a part of a drive train for any number of vehicles having a power plant that is used to provide motive force to the vehicle. Thus, the differential 10 includes a housing, generally indicated at 12. The housing 12 may support a ring gear 14 that is designed to be driven in meshing relationship with the pinion gear 16 fixed to a drive shaft 18. The ring gear 14, pinion 16 and driveshaft 18 are shown in phantom in FIG. 1. The housing 12 may be composed of a main body 20 and a cap 22 that is fixedly mounted to the main body 20 at a pair of mating annular flange portions 24A and 24B via bolts 26 or any other suitable fastening mechanism. The ring gear 14 may also be mounted to the housing 12 at the mating flanges 24A, 24B via the fastener 26. Those having ordinary skill in the art will appreciate from the description that follows that the housing may be defined by any conventional structure known in the related art and that the present invention is not limited to a housing defined by a main body and a cap portion.

Similarly, the housing 12 may be driven by any conventional drive mechanism known in the related art and that the invention is not limited to a housing that is driven via a ring gear, pinion, and drive shaft.

The main body 20 defines a hub 28 that supports one 30 of the pair of axle half shafts 30, 32. Similarly, the cap 22 defines an opposed hub 34 that supports the other one 32 of a pair of axle half shafts. Together, the main body 20 and cap 22 of the housing 12 cooperate to define a cavity 36. A differential mechanism, generally indicated at 38, is supported in the cavity 36 defined by the housing 12. The differential mechanism 38 is also illustrated in the exploded view of FIG. 3 and includes a pair of clutch members 40 disposed in spaced axial relationship with respect to one another. The clutch members 40 are operatively supported for rotation with the housing 12. A pair of side gears 42, 44 is operatively adapted for rotation with a corresponding one of the pair of axle half shafts 30, 32. To this end, the side gears 42, 44 define splines 46 on the inner circumference thereof that are matingly received in corresponding splines defined on the axle half shafts 30, 32. A pair of clutch mechanisms 48, 50 is operatively disposed between each corresponding pair of clutch members 40 and side gears 40, 42. To this end, the side gears 42, 44 include splines 52 on the outer circumference thereof. The clutch mechanism 48, 50 includes a plurality of friction disks 54 that are cooperatively splined to the outer circumference of the side gears 42, 44 and are rotatable therewith. Similarly, each of the pair of clutch members 40 includes a plurality of splines 56 formed on the inner circumference thereof. A series of plates 58 are operatively supported on the splined inner circumference 56 of the clutch members 40 and are interleaved between the plurality of friction disks 54 supported on the side gears 42, 44. The pair of clutch members 40 are axially moveable within the housing 12 to engage a respective clutch mechanism 48, 50 to couple their associated axle half shafts 30, 32 together in the event of a predetermined amount of differential movement between the axle half shafts as will be described in greater detail below. One embodiment of the locking differential of the type contemplated by the present invention may also employ a plurality of biasing members 60 that are disposed between the clutch members 40 and received in pockets 61 formed in the opposed clutch members 40 to urge the clutch members 40 away from one another.

Figure 3:
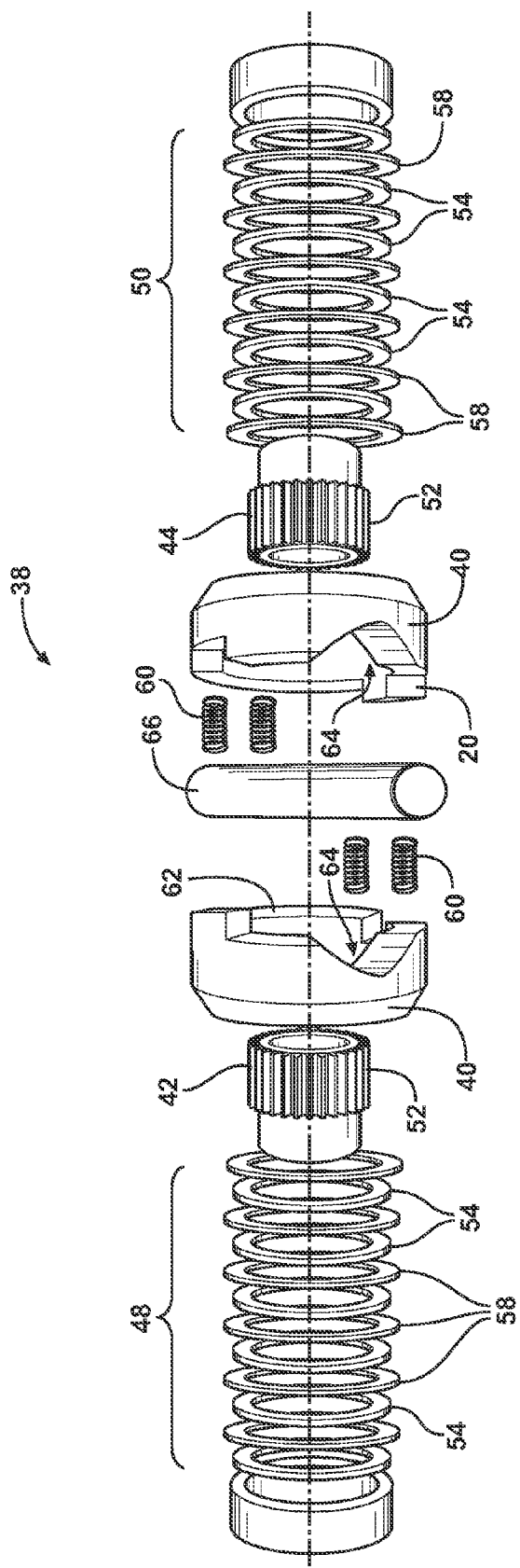
FIG. 3 is an exploded view of the differential mechanism of the present invention.
Figure 4:
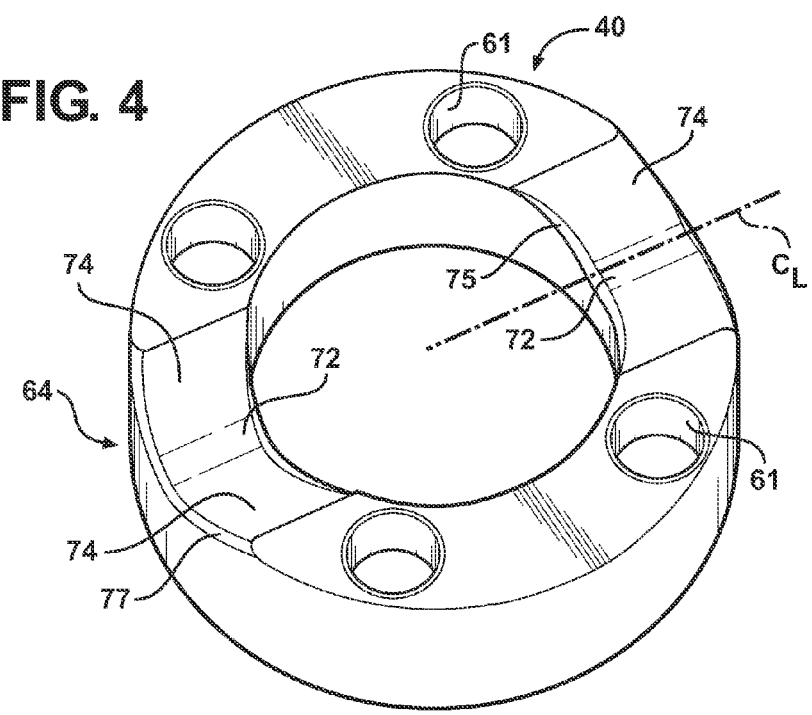
FIG. 4 is a perspective elevational view of a clutch member of the present invention.
Figure 6:
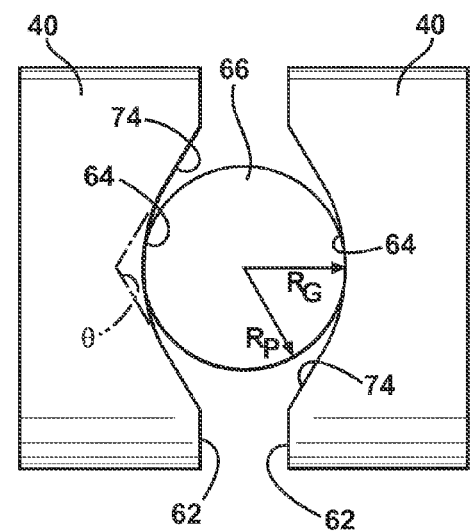
FIG. 6 is a cross-sectional end view illustrating clutch members having a groove with a radius of curvature larger than the radius of curvature of the associated cross pin of the present invention.

Each of the pair of clutch members 40 presents an inwardly directed face 62 disposed in spaced axial relationship to one another. As best shown in FIGS. 3, 4 and 6, each of the inwardly directed faces 62 of the pair of clutch members 40 includes a groove, generally indicated at 64, disposed in facing relationship with respect to the other. A cross pin 66 is received in the grooves 64 and is operatively connected for rotation with the housing 12. To this end, the differential 10 may also include a tubular mounting sleeve 68 splined to the inner circumference of the main body 20 of the housing 12 (FIG. 2). The cross pin 66 may be fixed to the tubular sleeve at corresponding apertures 70 formed in the sleeve 68 for this purpose. However, those having ordinary skill in the art will appreciate from the description set forth herein that the cross pin 66 may be operatively mounted for rotation with the housing 12 in any suitable manner.

As best shown in FIG. 6, each of the grooves 64 defines an arc having a first radius of curvature $R_G$ and a pair of working surfaces 74 extending from either side of the grooves 64 laterally relative to one another. The groove 64 is disposed between and operatively interconnects the pair of working surfaces 74. In addition, in one embodiment, the working surfaces extend at an obtuse angle θ relative to each other. On the other hand, the cross pin 66 defines a second radius of curvature $R_P$. In its operative mode, the cross pin 66 engages the working surfaces 74 to drive the clutch members 40 axially outwardly to thereby engage the clutch mechanisms 48, 50, thereby coupling the axle half shafts 30, 32 together as will be described in greater detail below.

Figure 5:
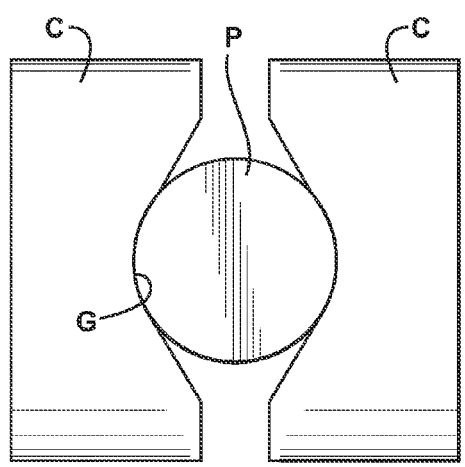
FIG. 5 is a cross-sectional end view illustrating the interrelationship between the cross pin and a groove in the clutch members known in the related art.

More specifically, the locking differential 10 of the type described above allows for a certain amount of limited slip between the axle half shafts 30, 32 to which it is mounted. However, in an automotive context, for example, when one of the tires is solidly supported and the other one is slipping (such as when one tire is on the pavement and the other is on a slippery surface, such as ice) the differential acts to transfer torque from the slipping tire to the solidly supported tire. This occurs when the cross pin 66 engages the working surfaces 74 of the groove 64 disposed on opposite sides of the centerline $C_L$ of the groove 64 to move the associated clutch member 40 into engagement with an associated clutch mechanism 48, 50 thereby coupling the axle half shafts 30, 32 of the spinning tire to the other solidly supported shaft. In this way, torque is transferred from the slipping tire to the solidly supported tire thereby allowing the vehicle to be driven even though one of the tires is slipping. The opposed working surfaces 74 that are engaged by the cross pin 66 in this operational embodiment are disposed on opposite sides of a centerline $C_L$ bisecting the groove 64 (FIG. 4).

Where there is no differential movement between the axle half shafts 30, 32, the cross pin 66 is positioned within the groove 64 of the clutch members 40 as illustrated in FIG. 6. This is compared to differential mechanisms typically employed in the related art as illustrated in FIG. 5. There, the bottom of the groove G has substantially the same radius of curvature as the cross pin P. In this disposition, the cross pin and the groove of the clutch member C establish surface contact between each other. However, when all of the components of the differential are rotating together, the significance of any surface contact between the groove G and the clutch member C is irrelevant because there is no differentiation among the components. But surface contact of the type illustrated in FIG. 6 and typically employed in the related art resists movement of the cross pin P relative to the clutch members C when differential movement is required. This resistance to movement creates a shock force and increases wear between the components.

On the other hand and as noted above, the present invention includes a pair of clutch members 40 having a groove 64 that defines a first predetermined radius of curvature $R_G$ and a cross pin 66 that defines a second radius of curvature $R_P$. The first predetermined radius of curvature $R_G$ of the groove 64 is greater than the second predetermined radius of curvature $R_P$ of the cross pin 66. Thus, the contact between the cross pin 66 and the groove 64 defines a line extending along the axis of the cross pin 66.

During normal, non-differentiated movement between the axle half shafts 30, 32, such as when a vehicle is driving in a straight path down a road, the line contact is more than sufficient to transfer torque between the cross pin 66 and the clutch members 40 because all the components rotate together. However, in the event of differential movement between one or the other of the axle half shafts 30, 32 and its associated side gear 42, 44, the cross pin 66 moves relative to the groove 64 and engages an opposed pair of working surfaces 74. The groove 64 having a larger radius of curvature $R_G$ than the cross pin 66 provides less resistance to the movement of the cross pin 66 to the working surfaces 74 of the clutch members 40 at the beginning of this differential movement. Accordingly, the specific interrelationship between the cross pin 66 and the groove 64 reduces the shock that is generated at this moment of differentiation. This results in smoother operation of the differential and reduced wear between the cross pin and the groove of the clutch members.

The invention has been described in great detail in the foregoing specification, and it is believed that various alterations and modifications of the invention will become apparent to those having ordinary skill in the art from a reading and understanding of the specification. It is intended that all such alterations and modifications are included in the invention, insofar as they come within the scope of the appended claims.

I claim:

1. A locking differential for automotive vehicle comprising:
    a housing and a differential mechanism supported in said housing, said differential mechanism including a pair of clutch members disposed in spaced axial relationship with respect to one another and operatively supported for rotation with said housing;
    a pair of side gears operatively adapted for rotation with a corresponding pair of axle half shafts, and a pair of clutch mechanisms operatively disposed between each corresponding pair of clutch members and said side gears;
    said pair of clutch members being axially moveable within said housing to engage a respective clutch mechanism to couple the axle half shaft together in the event of a predetermined amount of differential movement between the axle half shafts;
    each of said pair of clutch members presenting an inwardly directed face, each face including a groove disposed in facing relationship with respect to the other, and a cross pin received in said grooves and operatively connected for rotation with said housing;
    each of said grooves defining a first predetermined radius of curvature, said cross pin defining a second radius of curvature wherein said first predetermined radius of curvature of said groove is greater than the second predetermined radius of curvature of said cross pin such that contact between said cross pin and said groove defines a line extending along the axis of said cross pin; and
    wherein each of said grooves include a pair of planar working surfaces extending laterally relative to each other and wherein said first predetermined radius of curvature of said groove merges into said working surfaces.

2. A locking differential as set forth in claim 1 wherein said working surfaces extend at an obtuse angle relative to each other.

3. A locking differential as set forth in claim 1 wherein said clutch mechanism includes a friction clutch member having a plurality of friction disks supported for rotation with said side gear and a plurality of plates supported for rotation with a corresponding one of said clutch members and interleaved between said plurality of friction disks, said clutch mechanism operable to be compressed to engage said friction disks with said adjacent plates to couple said clutch member to an associated one of said side gears.

4. A locking differential as set forth in claim 1 wherein said groove defines a centerline and said cross pin engages said working surfaces disposed on opposite sides of said cross pin.

* * * * *